United States Patent

Aoyama et al.

[11] Patent Number: 5,557,841
[45] Date of Patent: Sep. 24, 1996

[54] PARTS FEEDING DEVICE

[76] Inventors: Yoshitaka Aoyama; Shoji Aoyama, both of 20-11, Makitsukadai 2-cho, Sakai-shi, Osaka 590-01, Japan

[21] Appl. No.: 290,782

[22] PCT Filed: Aug. 26, 1994

[86] PCT No.: PCT/JP94/01419

§ 371 Date: Jan. 25, 1995

§ 102(e) Date: Jan. 25, 1995

[30] Foreign Application Priority Data

Apr. 2, 1994 [JP] Japan .................................. 6-099070

[51] Int. Cl.$^6$ ............................. B23P 19/04; B23Q 3/15
[52] U.S. Cl. ............................ 29/743; 29/744; 81/125; 221/212
[58] Field of Search ................. 29/243.523, 243.525, 29/719, 743, 744, DIG. 95, DIG. 105, DIG. 44; 81/125; 227/112, 113, 130, 131; 221/211, 212

[56] References Cited

U.S. PATENT DOCUMENTS

| 3,550,484 | 12/1970 | Pecoraro | 81/125 X |
| 3,864,804 | 2/1975 | Kawaguchi | 29/719 X |
| 3,898,833 | 8/1975 | Richardson | 29/243.525 |
| 4,515,005 | 5/1985 | Klein | 29/243.525 |
| 5,191,691 | 3/1993 | Aoyama | 81/125 X |
| 5,205,456 | 4/1993 | Ohuchi et al. | 227/113 X |
| 5,230,141 | 7/1993 | Aoyama | 29/DIG. 95 X |
| 5,359,171 | 10/1994 | Aoyama | 221/212 X |
| 5,390,524 | 2/1995 | Higgs | 29/243.523 |

FOREIGN PATENT DOCUMENTS

| 0507472 | 10/1992 | European Pat. Off. . | |
| 4-270075 | 9/1992 | Japan . | |
| 921134 | 4/1982 | U.S.S.R. | 29/744 |

*Primary Examiner*—Peter Vo
*Attorney, Agent, or Firm*—Nikaido, Marmelstein, Murray & Oram LLP

[57] ABSTRACT

This invention provides an arrangement wherein members, such as a guide tube, feed rod, air cylinders, and parts feeding control unit, which perform the parts feeding function, are supported with good balance to ensure that a part is inserted in a receiving hole in a mating part, for example a hole in a movable electrode, accurately and with high reliability.

The basic arrangement comprises a guide tube 1 joined to the lower side 16 of a base plate 14, an air cylinder 29 attached to the upper side 19 of the base plate 14, and a stationary member 31 to which the air cylinder is firmly joined.

7 Claims, 3 Drawing Sheets

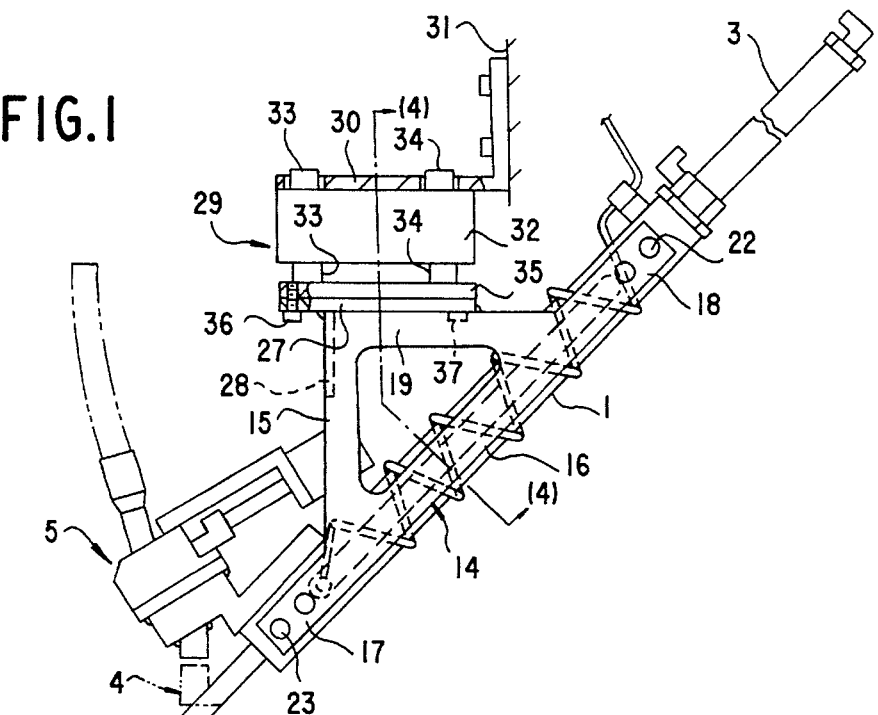
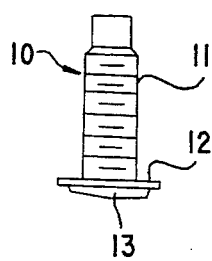
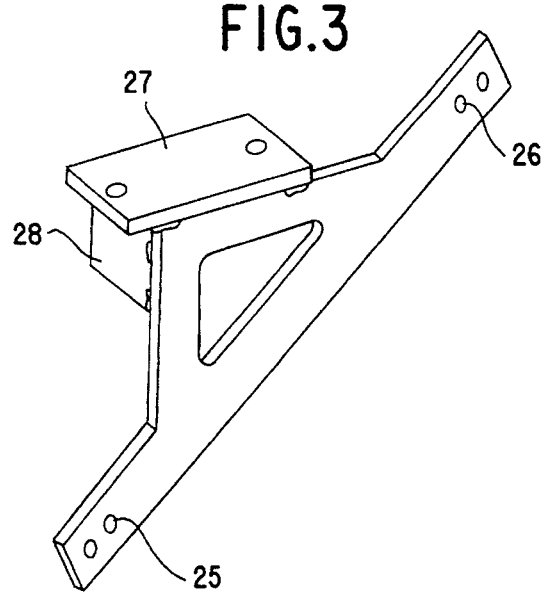

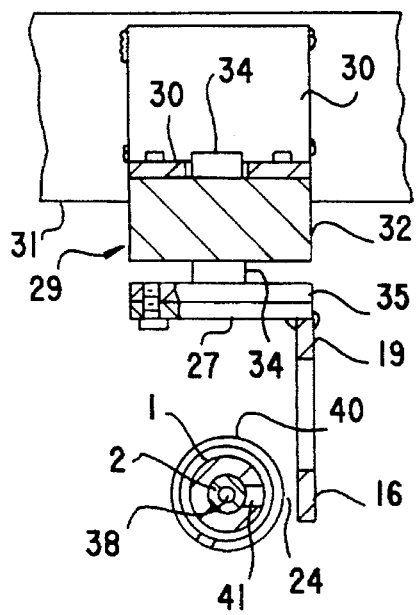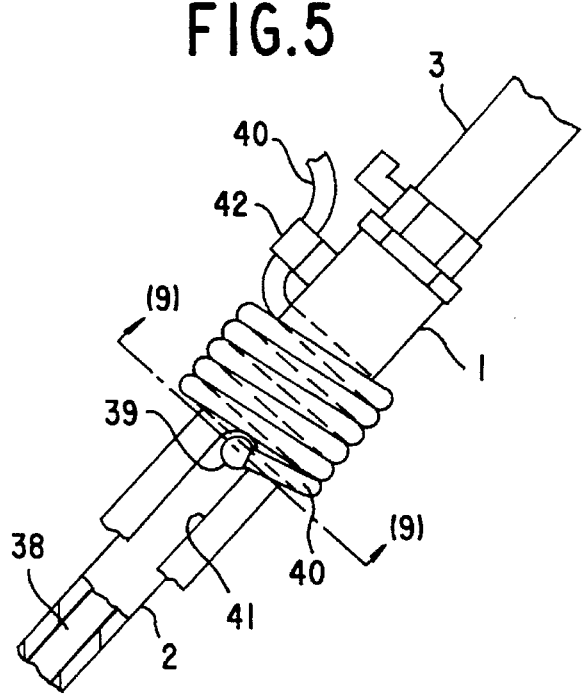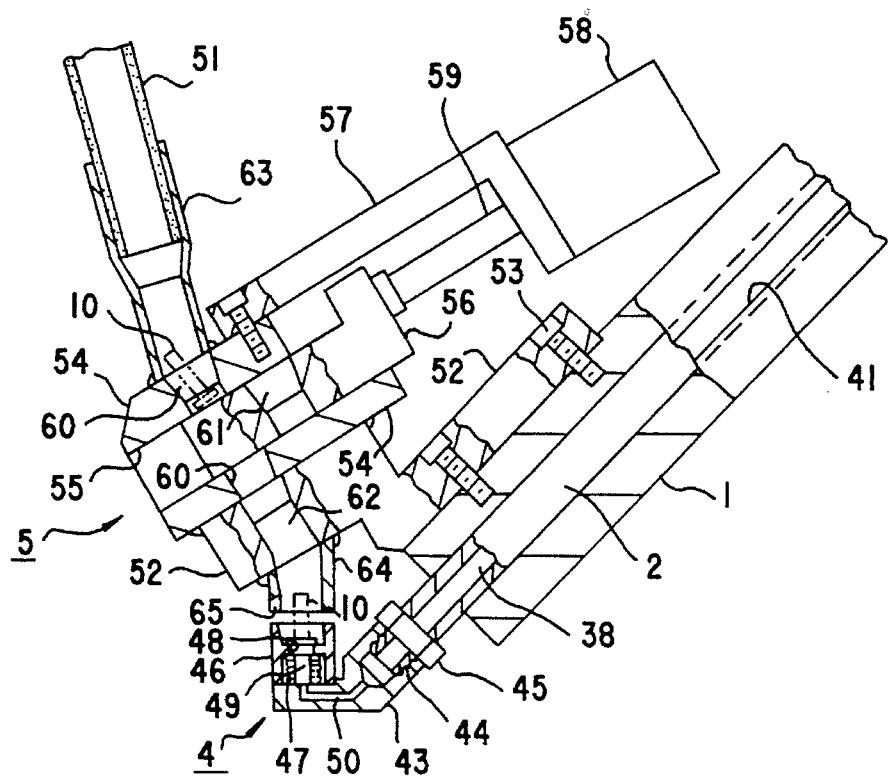

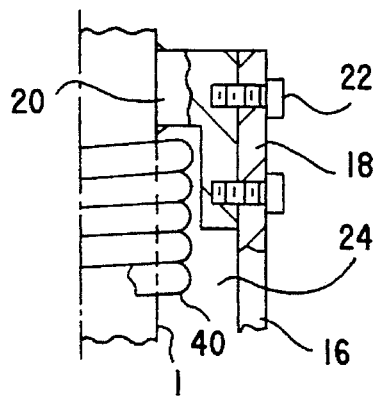
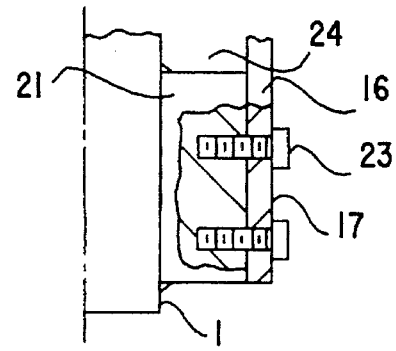
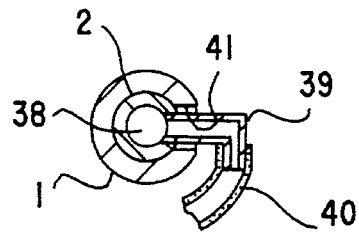
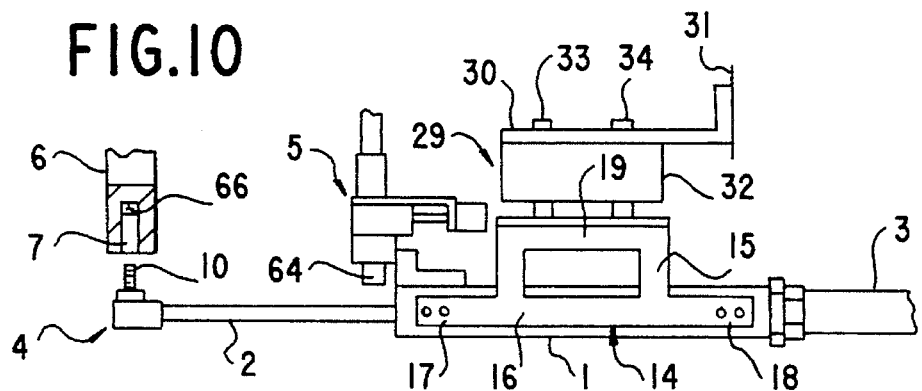
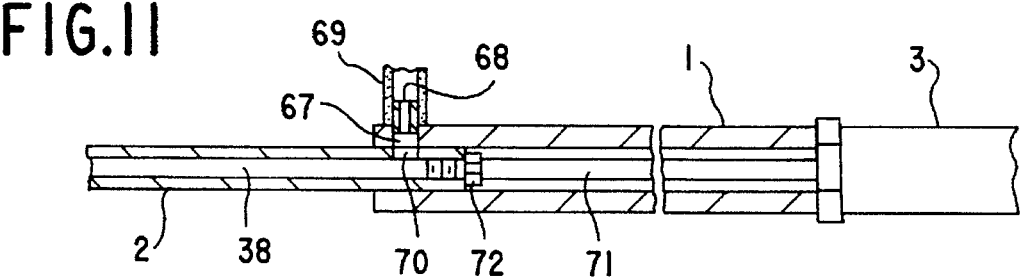

PARTS FEEDING DEVICE

BACKGROUND OF THE INVENTION

This invention relates to a parts feeding device of the type utilized in a field where a feed rod is received in a guide tube so that it can be advanced and retracted and parts held in the feed rod are fed to an intended place for insertion into a receiving hole in a mating member.

This type of parts feeding device is disclosed in Japanese Patent Kokai No. 270075/92. It Is of the type in which a feed rod is received in a guide tube so that it can be advanced and retracted and parts held in the feed rod are fed to an intended place for insertion into a receiving hole in a mating member, wherein a parts feeding tube for feeding parts to the feed rod and the guide rod are joined together by a bracket having an air cylinder fixed thereto, said air cylinder being firmly joined to a stationary member. A part fed from the parts feeding tube to the feed rod and held at the front end of the feed rod is positioned immediately below a movable electrode which is a mating member by the air cylinder. Thereafter, the air cylinder is operated to move the part to the movable electrode, whereby the part is inserted in the receiving hole in the movable electrode.

In the arrangement in which the piston rod of the air cylinder is connected to the bracket which is used to join the guide tube and the parts feeding tube together, as described above, the load acting on the piston rod becomes imbalanced, preventing smooth operation of the air cylinder. That is, when the guide tube is heavier than the parts feeding tube, a bending load acts on said vertically disposed piston rod, making it difficult for the piston rod to slide smoothly. Particularly, since a part has to be inserted in the receiving hole in the movable electrode, said bending load impedes the correct relative positioning between the part and the receiving hole, making it impossible to insert the part. Even if the bending load on the piston rod is removed by joining the stationary member and the movable member by a guide groove, an abnormal force acts on the guide groove, thereby making it impossible to attain a smooth guide slide movement.

SUMMARY OF THE INVENTION

The present invention has been provided to solve these problems. Claim 1 is directed to a parts feeding device of the type in which a feed rod is received in a guide tube so that it can be advanced and retracted and parts held in the feed rod are fed to an intended place for insertion into a receiving hole in a mating member. The guide tube is joined to the lower side of a base plate and an air cylinder is fixed to the upper side of the base plate, said air cylinder being supported by a stationary member, such that the stroke of said air cylinder effects insertion of a part into said receiving hole. The combined weight of the guide tube itself and member integral therewith acts on the stationary member through the upper and lower sides and air cylinder.

Claim 2 directed to a parts feeding device as set forth in claim 1, wherein an air cylinder for advancing and retracting the feed rod is joined to one end of the guide tube and a parts feed control unit for feeding parts to a holding member installed at the front end of the feed rod; thus, weight including that of said air cylinder and parts feed control unit acts on the stationary member as in claim 1.

Claim 3 is directed to a parts feeding device as set forth in claim 1, wherein a shim member is interposed between the lower side of the base plate and the guide tube and the clearance thus defined between the lower side of the base plate and the guide tube serves as an air hose passage space; thus, the air hose is disposed in the clearance is free to move in said clearance.

Claim 4 is a parts feeding device as set forth in claim 1, wherein an air passage is formed in the feed rod, said air passage having an air hose connected thereto through a joint, said guide tube being formed with an elongated opening for passing said joint therethrough; thus, when the feed rod is advanced and retracted, said joint passes through the elongated opening, being ready for feeding air to the air passage.

Claim 5 is a parts feeding device as set forth in claim 3, wherein the air hose is spirally wound around the guide tube; thus, in the clearance between the lower side of the base plate and the guide tube, the air hose is held spiral and capable of extending and retracting.

Claim 6 is a parts feeding device as set forth in claim 4, wherein a holding member for parts is joined to the front end of the feed rod and an air spout port formed in said holding member communicates with the air passage in the feed rod; thus, a part held in the holding member is fed into the receiving hole in the mating member by the spouted air.

Claim 7 is a parts feeding device as set forth in claim 6, wherein a magnet for attracting a part is disposed in the holding member; thus, the part is temporarily held in the holding member by the attracting force of the magnet.

BRIEF DESCRIPTION OF THE DRAWINGS

FIG. 1 is a side view showing a device of the invention in its entirety;

FIG. 2 is a side view of a projection bolt;

FIG. 3, is a perspective view of a base plate;

FIG. 4 is a sectional view taken along the line (4)—(4) in FIG. 1;

FIG. 5 is a side view showing a guide tube end with the base plate removed;

FIG. 6 is a side view, in longitudinal section, of a parts feed control unit;

FIG. 7 is a plan view of the guide tube end;

FIG. 8 is a plan view of the guide tube end;

FIG. 9 is a sectional view take along the line (9)—(9) in FIG. 5;

FIG. 10 is a side view showing another embodiment;

FIG. 11 is a side view, in longitudinal section, showing another air feed system.

DESCRIPTION OF THE PREFERRED EMBODIMENTS

First, an embodiment shown in FIGS. 1 through 9 will be described. A feed rod 2 is received in a guide tube so that it can be advanced and retracted. An air cylinder 3 joined to one end of the guide tube 1 has its piston rod (not shown herein, though shown in an embodiment of FIG. 11) connected to the feed rod 2. A holding member 4 for temporarily holding a part is joined to the front end of the feed rod 2. It is arranged that when the holding member 4 is in its most retracted position as shown in phantom lines in FIG. 1, a part is fed to said holding member 4. This is intended to feed parts one by one to the holding member 4, and this function is performed by a parts feed control unit (hereinafter referred to simply as the unit), said unit being joined to the other end of the guide tube 1 opposite to the air cylinder 3.

This embodiment is adapted to insert a part in the receiving hole 7 in a movable electrode 6, with a steel sheet part placed on a fixed electrode. The part in this embodiment is a projection bolt 10 of iron, comprising a flange 12 and a welding projection 13 in the form of a bulge on the flange. The projection 13 is in the form of a cone which is very flat. However, said projection may be replaced by a plurality (usually 3) of wartlike projections.

In order to support the integral structure consisting of the guide tube 1, feed rod 2, air cylinder 3 and unit 5, a base plate 14 is employed. The base plate 14 in this embodiment has as its principal portion a triangular portion 15 which is substantially a right triangle, with the guide tube 1 joined to the lower side 16 thereof. To ensure more stable support of the guide tube 1, the lower side 16 is provided with extensions 17 and 18 as seen in FIGS. 1 and 3, and in this case, what is called the lower side includes the extensions 17 and 18. Since the feed rod 2 is installed in the inclined state, the lower side 16 is disposed inclined, with the guide tube 1 disposed in the lateral position thereon. Shim members 20 and 21 are interposed between the guide tube 1 and the lower side 16 and welded to the guide tube 1, the lower side 16 being joined to said shim members 20 and 21 by bolts 22 and 23. In this way, a clearance 24 is defined between the guide tube 1 and the lower side 16. In addition, the reference characters 25 and 26 denote holes for said bolts 22 and 23 to pass therethrough.

A support plate 27 is welded to the upper side 19 of the base plate 14 and in order to increase the rigidity of this portion, a reinforcing plate 28 is welded to the triangular plate 15 and support plate 27. The air cylinder 29 is joined at its lower side to said support plate and at its upper side firmly to a stationary member 31 through a bracket 30. The air cylinder 29 has a cylinder 32 joined to the stationary member 31 by the bracket 30 and pistons (not shown), i.e., piston rods 33 and 34 adapted to advance and retract to produce outputs, it being of the tandem type with two piston rods, as shown, the two piston rods 33 and 34 having an output plate 35 joined thereto, said output plate being intimately contacted with and fixed to the support plate 27 by bolts 36 and 37. In this manner, the air cylinder 29 is installed on the upper side 19 of the base plate 14, with its piston rods 33 and 34 vertically disposed.

The feed rod 2 is provided with an air passage 38, as is clear from FIGS. 1, 5 and 9. And to feed air thereto, a joint 39 is screwed into the feed rod 2 and an air hose 40 is connected thereto. In order to allow the joint 39 to stroke, the guide tube 1 is formed with an axially extending elongated opening 41, through which the joint 39 extends. The air hose 40 is disposed in said clearance 24 while it is spirally wound around the guide tube 1. When the feed rod 2 is advanced, it changes from the contracted state shown in FIG. 5 to the extended state shown in FIG. 1. In addition, the reference character 42 in FIG. 5 denotes a clamp for fixing the air hose 40 to the guide tube 1.

The holding member 4 fixed to the front end of the feed rod will now be described mainly with reference to FIG. 6. The front end of the feed rod 2 is screwed at a threaded portion 44 into a main body 43, with a lock nut 45 serving to prevent loosening. A cylindrical guide member 46 is fixed to the front end of the main body as by welding, holds an annular magnet 47, and is formed thereabove with a flange 48 around its internal periphery, so that the flange 12 of the injection bolt 10 is temporarily held by the flange 48 as it is attracted by the magnet 47. The through-opening in the magnet 47 serves as an air spout opening 49 communicating with an air passage 50 formed in the main body 43 and communicating with the air passage 38 in the feed rod. The magnet 46 embedded in the guide member 47 constitutes a means for magnetically attracting the projection bolt 10. Alternatively, the magnet 46 may be replaced with a electromagnet which is made up of the guide member 47 embraced by a current-carrying coil.

The parts feed control unit 5 has only to have the function of feeding parts one by one the parts feeding hose 51 connected to a parts feeder (not shown) and an example thereof is shown in detail in FIG. 6. To describe the unit 5 with reference to this figure, the unit 5 is attached to the end of the guide tube 1 opposite to the air cylinder 3. A bracket 52 is firmly fixed to the guide tube 1 by bolts 53 and a head member 54 is welded thereto and has a passage hole 55 of rectangular cross-section, in which a control element 56 is slidably inserted. An arm element 57 is fixed to the upper surface of the head member 54 and an air cylinder 58 is attached thereto, with its piston rod 59 joined to the control element 56.

The head member 54, control element 56 and bracket 52 are formed with passage holes 60, 61 and 62, respectively, and a joint tube 63, communicating with the passage hole 60, is welded to the head member 54. The parts feeding hose 51 is inserted in said joint tub 63. Further, an outlet tube 64, communicating with the passage hole 62, is welded to the bracket 52. In the illustrated state, since the control element 56 is in the deviated position, the bolt 10 is caught by the control element 56, but when the control element 56 is slid to the lower left position by the action of the air cylinder 58 so that the passage holes 60, 61 and 62 communicate with each other, the bolt 10 passes through these passage holes to reach the outlet tube 64, from which it travels to the guide member 46. In addition, the outlet tube 64 is formed with a notch 65 for the bolt 10 to pass therethrough when the feed rod 2 is advanced. Further, the outlet tube 64 is positioned relative to the guide member 46 such that when the holding member 4 is fully retracted, the outlet tube 64 is continuous with the guide member 46 with a slight clearance left therebetween, as shown in FIG. 6.

In the above description, the air hose connected to each air cylinder is omitted from the illustration. Further, the actuating air for each air cylinder necessary to obtain the operations to be described below is omitted from the detailed description since sequence control can be easily performed by a combination of known means, such as electromagnetic type air control valves and electric control circuits.

The operation of the above embodiment will now be described. In the state of FIG. 6, when the bolt 10 is received by the holding member 4, the feed rod 2 is advanced by the action of the air cylinder 3, whereupon the air hose is extended to assume the spiral form shown in FIG. 1. The advance of the feed rod 2 stops at a position where the bolt 10 is coaxial with the receiving hole 7. Subsequently, the air cylinder 29 is actuated to lift the base plate 14, so that part of the bolt 10 enters the receiving hole 7, whereupon air is spouted out of the air spout port 49, whereby the bolt 10 held attracted to the magnet 47 is forcibly inserted into the innermost region of the receiving hole 7. Thereafter, the feed rod 2 performs a movement reverse to the previous one, thus returning to the original position shown in FIG. 6. The thus inserted bolt 10 is attracted to the magnet 66 installed in the innermost region of the receiving hole 7 and is thus prevented from falling. When the movable electrode 6 holding 10 is lowered to press the projection 13 on the bolt against the steel sheet part 9, an electric current is passed through the two electrodes, the projection 13 is fused.

An embodiment shown in FIG. 10 will now be described. This is of the type in which the feed rod 2 is horizontally advanced and retracted and the members which perform the same functions as those in the preceding embodiment are denoted by the same reference characters to omit a detailed description thereof. The difference from the preceding embodiment is that since the feed rod 2 strokes horizontally, the shape of the base plate 14 is changed. That is, as shown, the base plate 14 is rectangular. As for the rest of the arrangement, the air cylinder 29, unit 5, air cylinder 3, bracket 30, etc., are the same as in the preceding embodiment. In this case, however, the spiral air hose is replaced by a system shown in FIG. 11. That is, the guide tube 1 is formed with a passage hole 67 and a joint 68 is fitted therein for connecting the air hose 69. The feed 2 is also formed with a passage hole 70 communicating with the air passage 38. Thus, when the feed rod 2 strokes until the passage holes 67 and 70 coincide with each other, the air for projecting the bolt 10 is fed to the holding member 4. In addition, the piston rod 71 of the air cylinder 3 is screwed into the feed rod 2 and a lock nut 72 is applied thereto to prevent loosening.

According to the invention, the guide rod is joined to the lower side of the base plate, and an air cylinder is fixed to the upper side of the base plate and is firmly supported by a stationary member; therefore, the load of the parts feeding device is firmly supported under high rigidity by the stationary member through the air cylinder. By making the shape of this base plate triangular or rectangular as shown, the load can be supported with good balance when the feed rod is installed obliquely or horizontally; therefore, the slide portion of the air cylinder fixed to the upper side of the base plate can be prevented from being subjected to a bending force or such subjection can be minimized. Thus, a smoothly operable, durable device is obtained.

An air cylinder is joined to one of the guide tube and a parts feeding control unit is attached to the other end and the base plate imposes loads on the stationary member in the manner described above; therefore, a support system superior in load balance consisting mainly of the guide tube and base plate is established. Therefore, when the feed rod is advanced to move the feed member to the intended position, the relative positions of the part on the feed member and the receiving hole are correctly maintained, so that insertion of the part into the receiving hole is accurately achieved.

Shim members can be interposed between the lower side of the base plate and the guide tube to define a clearance therebetween. Furthermore, the air hose can be installed by spirally winding it around the outer periphery of the guide rod; thus, the air hose can be rationally extended and contracted, a fact which is also advantageous from the standpoint of space saving.

The guide tube is formed with an elongated opening for the air hose joint to pass therethrough; therefore, air can be reliably fed to the air passage in the feed rod at the time of stroke.

The part temporarily held by the holding member is forcibly pushed out by air from the air spout port, a fact which, combined with the fact that the holding member is brought close to the receiving hole by the air cylinder, makes it possible to reliably transfer the part to the receiving hole.

Further, since the holding member has a magnet installed therein for attracting a part, such part is temporarily firmly hold as it is attracted by the magnet; thus, the part can be prevented from slipping off the holding member when the feed rod is advanced.

What is claimed is:

1. A parts feeding device having a feed rod received in a guide tube such that the feed rod can be advanced and retracted and whereby parts held in the feed rod are fed to a predetermined position for insertion into a receiving hole in a mating member, wherein the guide tube is joined to an air cylinder supported by a stationary member, wherein a stroke of said air cylinder inserts a part from the feed rod into said receiving hole, said parts feeding device further comprising a holding member for magnetically attracting and holding parts, said holding member being joined to one end of the feed rod, with an air spout port formed in said holding member, wherein said air spout port communicates with a compressed air supply, and a part magnetically held by the holding member is urged by air from the air spout port toward the receiving hole, thereby effecting transfer of the part to the receiving hole.

2. A parts feeding device as set forth in claim 1, wherein an air cylinder for advancing and retracting the feed rod is joined to a first end of the guide tube and a parts feed control unit for feeding parts to a holding member installed at are end of the feed rod.

3. A parts feeding device as set forth in claim 1, wherein a shim member is interposed between the lower side of the base plate and the guide tube and a clearance thus defined between the lower side of the base plate and the guide tube forms an air hose passage space.

4. A parts feeding device as set forth in claim 3, wherein the air hose connects said air spout port to said compressed air supply and is spirally wound around the guide tube.

5. A parts feeding device as recited in claim 1, wherein the guide tube is joined to a lower side of a base plate.

6. A parts feeding device as recited in claim 1, wherein the air cylinder is fixed to an upper side of a base plate.

7. A parts feeding device as recited in claim 1, wherein an air passage is provided in the feed rod, with the air passage having an air hose connected thereto through a joint, and wherein the guide tube is formed with an elongated opening for passing the joint therethrough.

* * * * *